United States Patent [19]

Rao

[11] 4,235,617
[45] Nov. 25, 1980

[54] FABRICATION OF ROTARY HEAT EXCHANGERS MADE OF MAGNESIUM ALUMINUM SILICATE GLASS-CERAMIC

[75] Inventor: V. Durga N. Rao, Bloomfield Hills, Mich.

[73] Assignee: Ford Motor Company, Dearborn, Mich.

[21] Appl. No.: 17,292

[22] Filed: Mar. 5, 1979

[51] Int. Cl.³ .................. C03B 19/06; C03B 32/00
[52] U.S. Cl. ............................................. 65/18; 65/32; 65/33; 264/63
[58] Field of Search ........................ 65/18, 33, 32; 106/39.6; 264/63

[56] References Cited

U.S. PATENT DOCUMENTS

| | | | |
|---|---|---|---|
| 3,112,184 | 11/1963 | Hollenbach | 264/63 X |
| 3,450,546 | 6/1969 | Stong | 65/33 X |
| 3,480,452 | 11/1969 | Fleischner et al. | 65/33 X |
| 3,940,255 | 2/1976 | Harrington et al. | 65/33 |
| 4,017,347 | 4/1977 | Cleveland | 264/63 X |
| 4,142,879 | 3/1979 | Fritsch, Jr. et al. | 65/18 |

FOREIGN PATENT DOCUMENTS

| | | | |
|---|---|---|---|
| 5112808 | 1/1976 | Japan | 65/33 |
| 1535202 | 12/1978 | United Kingdom | 106/39.6 |

*Primary Examiner*—Richard V. Fisher
*Attorney, Agent, or Firm*—Donald J. Harrington; Keith L. Zerschling

[57] ABSTRACT

A process for fabricating cordierite-type magnesium aluminum silicate regenerator cores comprising the steps of preparing a glass powder and combining it with a block polymer binder, forming the binder and glass-ceramic mixture into a ribbed tape which is wound upon itself to produce a honeycomb structure and subjecting the honeycomb structure to firing cycles to achieve binder burn-off, controlled nucleation, densification and crystallization whereby the glass-ceramic structure is characterized by a relatively low thermal expansion during operation in an environment where temperature reversals occur, the glass ceramic structure thereby being more resistant to chemical attack due to corrosive gases in an engine exhaust gas environment and the strength of the structure thereby being increased.

5 Claims, 10 Drawing Figures

A - Glass From Media
B - Starting Glass
D - Binder

D' - Voids

C - Crystal
D' - Voids

G-Crack

D'-Void

A-Glass From Media
B-Residual Glass
C-Converted Crystal (Primary)
D-Binder
E-Grain Surface (Orig.)
G-Crack C-Converted Crystal (Primary)
D'-Voids
E-Grain Surface (Orig.)
F-Converted Crystal (Secondary)

FABRICATION OF ROTARY HEAT EXCHANGERS MADE OF MAGNESIUM ALUMINUM SILICATE GLASS-CERAMIC

BRIEF DESCRIPTION OF THE INVENTION

The process of my invention is used with a cordierite type magnesium aluminum silicate. This material is a glass-ceramic that is well known commercially. It is described, for example, in U.S. Pat. Nos. 2,920,971 and 3,734,767.

In the fabrication of heat exchangers using a cordierite glass-ceramic (e.g., $2MgO.2Al_2O_3.5SiO_2$), a plastic binder is used with the glass-ceramic. After the glass-ceramic is reduced to powder form, a binder of block-polymer such as styrene-butadiene, a thermoplastic elastomer, is mixed with the glass powder and formed into a ribbed tape which is then wound to produce a honeycomb structure. One such structure is shown, for example, in U.S. Pat. No. 3,112,184. The honeycomb structure then is processed through various firing cycles to produce binder burn-off, nucleation, densification and crystallization.

Manufacture of a suitable powder in prior art systems is an expensive process, and the length of the firing cycles in prior art processes must be relatively long to reduce the amount of residual glass following the crystallization stage. The delicate setting that is required during firing also adds to the cost of manufacture since the cooling fixtures must be adapted to accommodate the large firing shrinkages encountered within the glass ceramic. My improved process will eliminate much of this cost thereby making the process feasible for large volume regenerator production for use with automotive gas turbine engines.

Part of the cost that is associated with prior art regenerator fabrication resides in the cost of producting the glass frit. Normally glass frit is produced by melting glass and then quenching it in water to produce the fractures necessary to produce a fine frit. In the case of a cordierite type glass ceramic, quenching the molten glass makes it extremely hard, and the glass frit that is produced by the quenching cannot be ground without using expensive processes. Because of this, it is normal practice to cool the glass slowly, usually using a set of rolls, to a temperature below 1,800° F., which is followed by rapid cooling. But even with such controlled cooling it has been found that the glass frit is too hard and must be ground with special grinding media to avoid contamination. The special operations required by this grinding are expensive.

Another disadvantage of prior art fabrication techniques is the lack of crystallization of the starting glass material during the firing cycles. Most glass ceramics, unless prolonged crystallization treatments are used, cause crystallization of the starting glass to be incomplete since glass and crystal have different coefficients of thermal expansion. The rapid heating and cooling during heat exchanger service then generates severe thermal stresses. The magnitude of these stresses depends upon the amount and distribution of residual glass, the thermal cycling temperature range and cycling rate as well as the differential thermal expansion coefficients of the glass and the crystal. These stresses can be high enough to induce cracking and component failure.

In addition to this problem of differential rates of expansion, problems also arise because of the difference in density of the crystal with respect to that of the glass. The glass, being thermodynamically unstable, continues to transform to the stable crystalline form during operation in service, the rate of transformation being dependent upon the temperature range and the pressure exerted on the glass. The thermal stresses generated due to the thermal cycling during operation in service, as well as the differential thermal expansion, causes a significant change in volume. Since temperature distribution in the heat exchanger is not uniform, the volume changes also are not uniform. This differential volume results in thermal instability and generates serious stresses that also can cause component failure.

Prior art glass-ceramic regenerators also are often subjected to high corrosion rates because of their susceptability to chemical attack by the exhaust gas environment in which they are operated. The corrosion rate is higher when two phases are present in the same material rather than either the single glass phase or the single crystal phase. If the regenerator is operated in a highly corrosive atmosphere, which may be the result of combustion of fuels with high sulphur content or combustion in an environment that includes highway road salt, chemical attack occurs at the glass-crystal interface resulting in severe weakening in those structures where both glass and crystal phases exist.

I have overcome many of these difficulties with my improved process. In my process a large volume of plastic binder is used. This binder is a styrene-butadiene or similar thermoplastic elastomer or block polymer. The binder is expelled during a binder burn-off stage of the firing cycle, which leaves a void between the glass particles. During the sintering stage the glass particles bond together and agglomerate, which produces a denser structure. During this densification stage linear shrinkages of up to 20% can occur. When a conventional cordierite material is used, cracking can occur during this shrinkage stage unless during cooling a suitable support structure is provided to allow a free movement of the glass ceramic body. My improved process reduces firing shrinkage thus reducing the complexity of the settering and reducing the possibility of cracking during settering.

Cordierite crystal exhibits anisotropic thermal expansion in the fired bodies made from such materials. It is desirable to obtain an extremely fine grain size in order to achieve high strength and low thermal expansion. The sintering operations normally used in prior art processes produce a fairly coarse grain size in the fired body. My improved process will produce a hard body of low shrinkage and low thermal expansion with resulting high strength and high yield characterisitics. The short firing cycles that are possible using my process and also the low firing shrinkages characteristic of my process make my process adaptable for tunnel kilns used in mass production.

PARTICULAR DESCRIPTION OF THE INVENTION

Figure 1A:
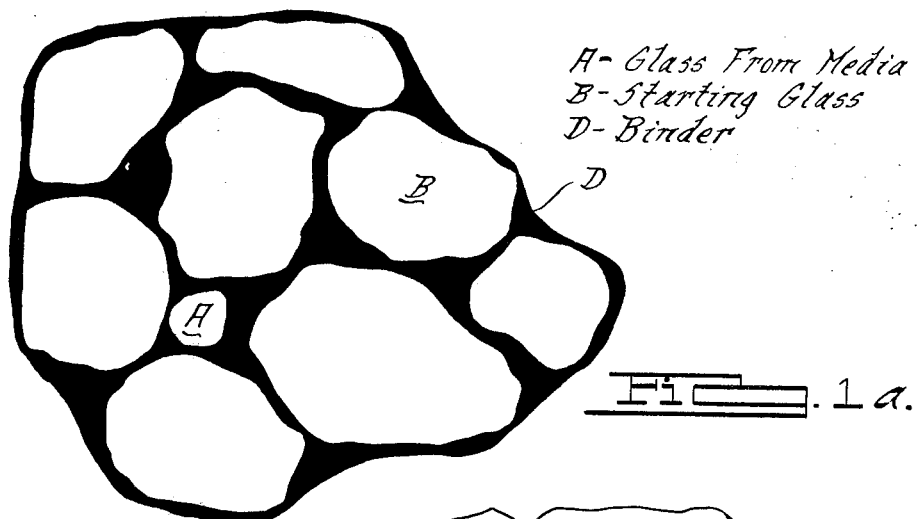
FIGS. 1a through 1c show in schematic, magnified form the crystals of glass that are used as a starting material in the manufacture of my improved glass ceramic structure.

A first phase of my improved process deals with powder preparation. The production of powder or glass frit from a melt of glass is necessary to produce a material for combining with the binder previously described. Nucleation and crystallization are allowed to progress in the glass frit to a sufficient degree so that no crystallization is required or takes place during the firing cycle.

The glass of the cordierite based composition is melted in an appropriate container, such as a platinum hearth, and is drawn on a series of beds maintained in a temperature range of 2,100° F. to 1,500° F. The temperature that should be used within that range depends upon the glass composition. For example, in the case of cordierite MAS material ($2MgO.2Al_2O_3.5SiO_2$) with the addition of one or more nucleating agents and crystallization aids, the holding period during the cooling is 30 minutes to 2 hours. During that time nearly 50% to 90% of the glass is converted to the crystalline state. The glass is then quenched in water and maintained at a temperature of 50° F. or lower. The purpose of this treatment is to take advantage of differential thermal expansion between the glass and the crystalline states and to take advantage of the anisotropic thermal expansion of the cordierite crystal. When the plastic crystallized glass is quenched, further thermal stresses are established between and the glass and the crystal interface because of the difference in the thermal expansion rates of the two phases. The anisotropic thermal expansion of the crystal produces severe stresses between the grains of the crystal, and these stresses are severe enough to shatter the frit into tiny fragments as well as to produce numerous cracks in the crystalline phase. This condition makes the frit friable and easy to grind. This is in contrast to the extremely hard frit produced by conventional processes without the pre-crystallization treatment. Grinding of the frit produced by my process results in a powder fine enough for grinding with little or no crushing required.

The next phase of my process deals with grinding. The frit should be ground at a high speed and high energy ball mills should be used. Attrition of the ball mills plays only a minor roll during this grinding operation since the impact energy is the primary size reduction mode. In contrast the hard materials used in conventional grinding operations made contamination from the grinding media a serious problem. The weak, friable powder particles produced in my method cause a minimum amount of contamination. In any case in the event that even a slight contamination might occur, the grinding media should be made from glass of the same composition as the starting frit material. When the grinding media is produced from the same glass and is quenched from the melting temperature of the glass, extremely hard grinding balls are produced and the pickup of contamination from the grinding media will be an extremely fine glass of a size less than two microns.

The amount of the glass pickup from the grinding media should be taken into account in determining the portion of the glass that is crystallized in the frit.

The particle size of the powder produced by this process is in the ½ to 20 micron size range with an average of less than ten microns. The crystal-to-crystal glass ratio should be approximately 70 to 30. That ratio will result in a fired part with a thermal expansion of less than 11,000 parts per million (PPM) at 800° C., and a four point bend strength of no less than 12,000 PSI.

The next part of my improved process deals with the firing cycles. Sintering and crystallization of the glass occurs concurrently during firing; and the degree to which each takes place determines the final fired shrinkage porosity grain size, strength, thermal stability and thermal expansion after firing.

Figure 1B:
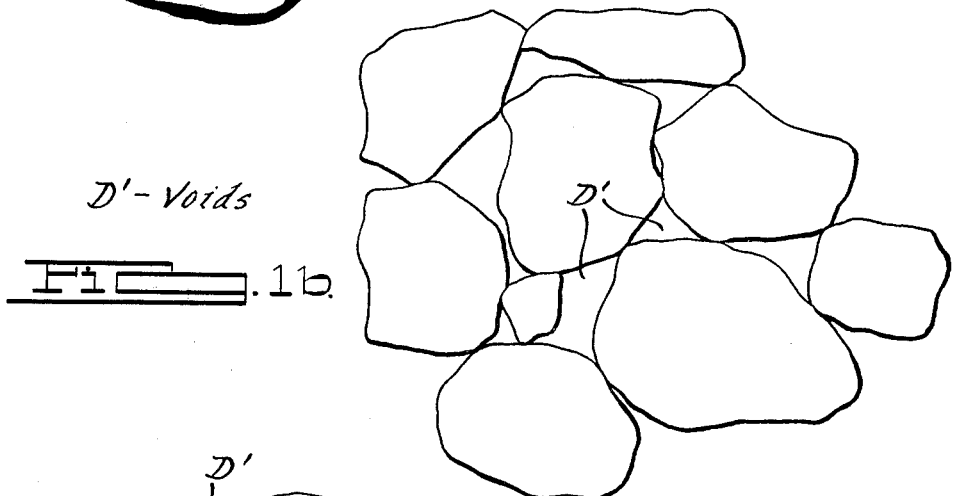
Figure 1C:
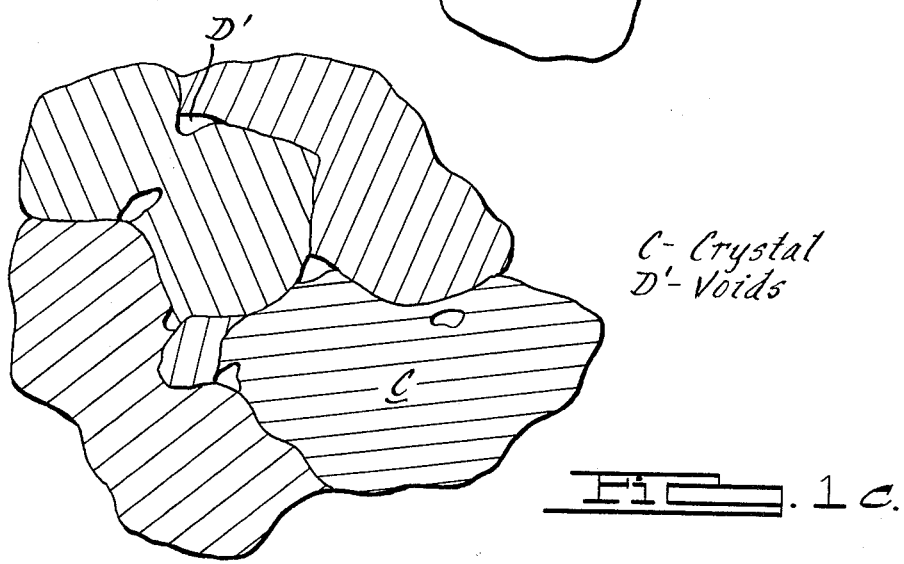

FIGS. 1a through 1c show the sequence of events that occur during the firing cycle using any of the normal kinds of glass powder. FIG. 1a shows a typical prior art section of a part fabricated from glass powder and a plastic carrier or binder. The glass particles are surrounded by the plastic and the plastic fills the voids between the particles. The presence of plastic between the particles permits the grains to slip against each other with minimum friction during forming of the ribbed tape mentioned previously. During the binder burn-off stage of the firing cycle, the plastic disintegrates or assumes a gaseous form thereby leaving voids as illustrated in the schematic sketch of FIG. 1b. There is some shrinkage during this stage and particles are generally in contact with each other, but there is no adhesion or adhesive bond between the particles, and the void volume is only slightly less than the binder volume at the beginning of the firing. Thus the structure is relatively weak at this stage.

As the part is heated, nucleation of the crystalling phase occurs when a temperature range of abut 1,500° F. to 1,700° F. is reached. Since glass is essentially a supercooled liquid, a particle surface is highly mobile and sintering occurs rapidly. Sintering also is aided by the residual stresses at the particle surfaces that are induced from the grinding operation. Sintering and agglomeration of the glass particles results in rapid densification and large shrinkages occur. This is illustrated in FIG. 1c. As crystallization progresses and consumes the glass phase in the process, the initial particle surfaces do not impede crystal growth. The impingement of the boundaries of the growing crystals against each other completes the crystallization. No further densification can occur unless the particles are heated to a fairly high temperature range where the elimination of grain boundaries and the agglomeration of grains occurs; and a liquid phase is achieved in contrast to the phenomena illustrated in FIGS. 1a through 1c.

Figure 2A:
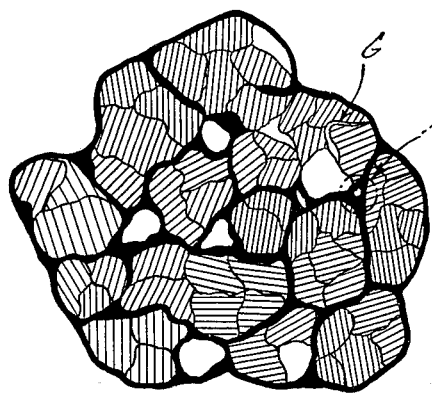
FIGS. 2a through 2g show various stages in crystal growth in a glass medium using my improved process.
Figure 2C:
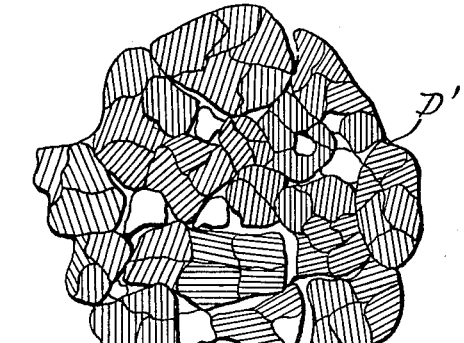
Figure 2D:
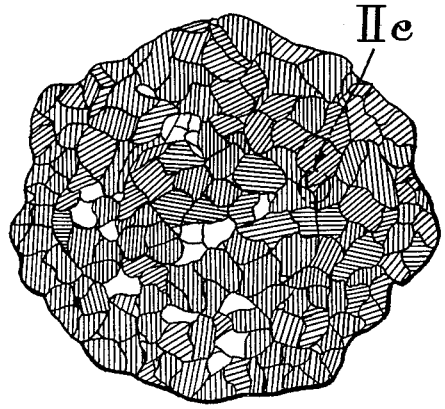
Figure 2B:
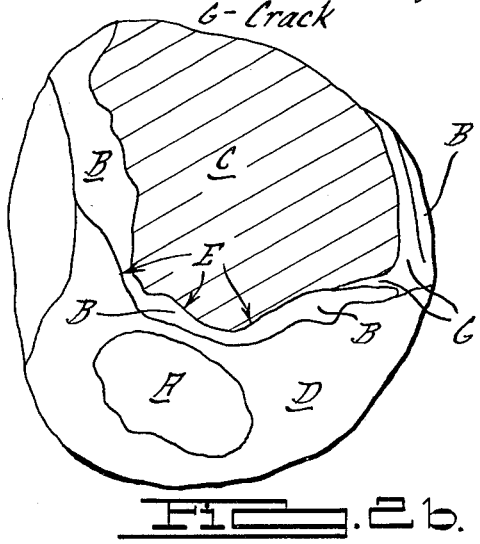
Figure 2E:
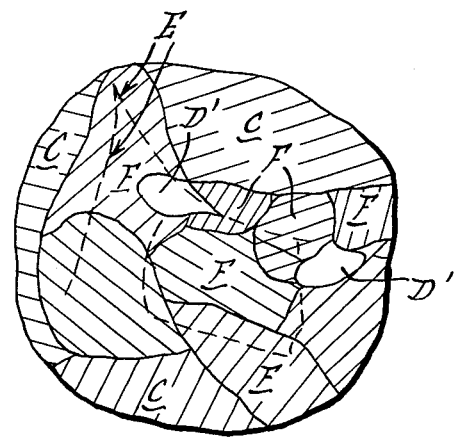
Figure 2F:
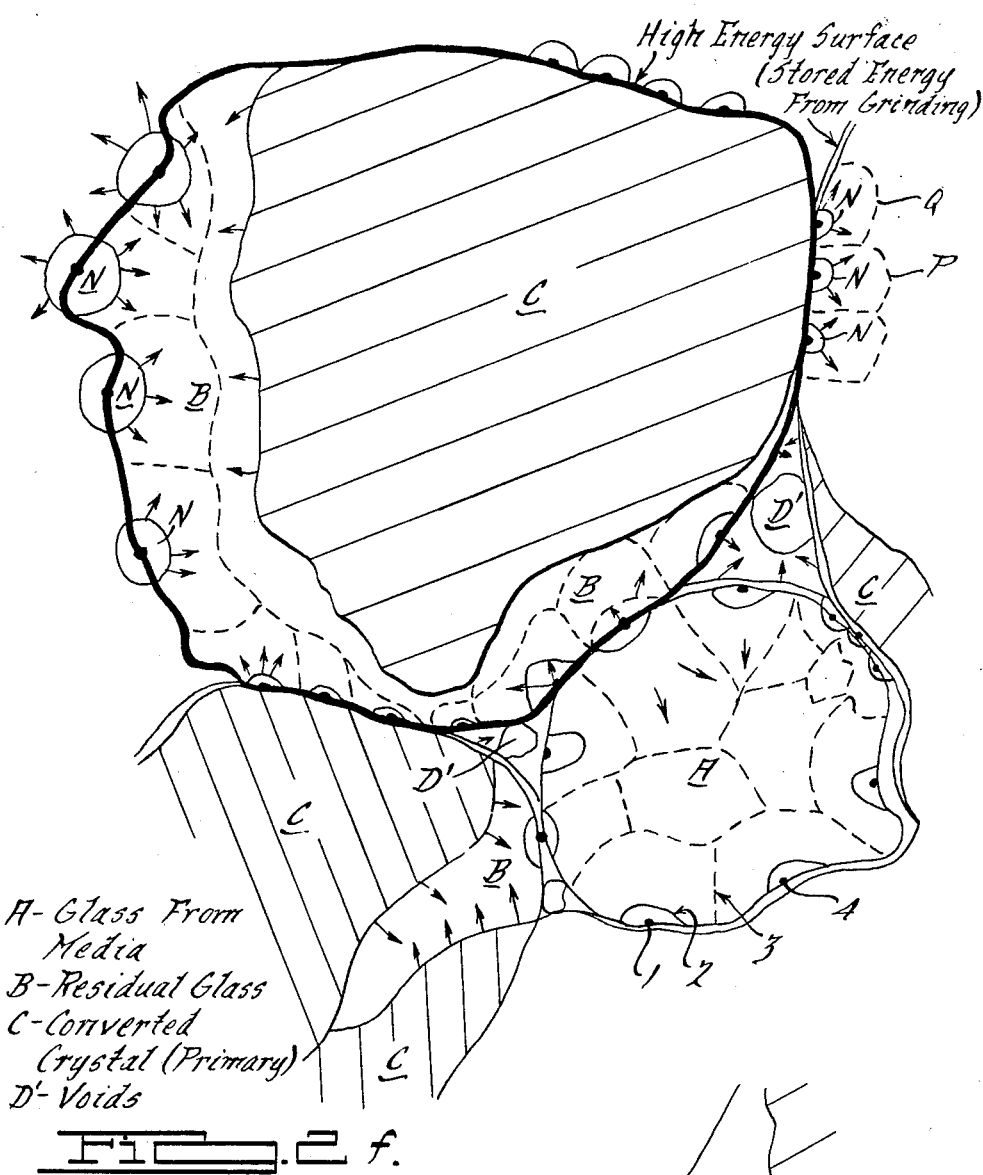

FIGS. 2a through 2f show the sequence of the reactions that occur during the firing of green parts from pre-crystallized powder in accordance with my improved process. FIGS. 2a and 2b show the structure of the green part prior to firing. Each particle is surrounded by the plastic binder D. The larger particles, which are the shaded crystal particles identified by the letter C, are the pre-crystallized glass. The smaller particles A occupy the space between the large particles and the glass particles. These particles A are picked up from the grinding media during grinding.

FIG. 2b shows a detail of the particle binder interface. The direction of the shading shows a crystal axis reference. When the glass is quenched after crystallization, cracks are generated along the crystal-glass interface. Impact grinding breaks the grain along the cracks. Thus the particles have residual glass at the outer surface. This is indicated by the symbol B. The crack in the grain shown at G is produced by impact grinding. The glass particles picked up by the grinding media are produced by attrition and, therefore, are rounded and much finer as shown at A.

During binder burn-off, which occurs at a temperature of about 1,000° F. to 1,100° F., the reactions are the same as those in the case of the glass powder described previously with reference to FIGS. 1a through 1c. Some shrinkage occurs at this time, and voids are created where the binder normally exists, but the finer grains and the better particle size distribution of the particles cause the structure to be stronger for that reason alone. Notwithstanding this, the structure still is too weak to handle at this stage. The shrinkage at this stage also is less because of the finer grain and particle distribution.

When the temperature reaches the nucleation range, which may be about 1,400° F. to 1,700° F., extensive nucleation will occur at the surface of the grain. This is due to the stored energy resulting from the high energy impact grinding. Nucleation occurs both in the residual glass as well as in the glass of the grinding medium. Nucleation will be much more extensive over the external surfaces when the crystalline and glass are in contact. This nucleation is less extensive when the contact between the particles is a glass-to-glass interface. When the temperature is raised, growth of these nuclei occurs as shown by the arrows N. This growth is more rapid than the internal crystal-residual glass interface growth because of the higher energy of the original powder particles. The nuclei generated by the sympathatic nucleation will have essentially the same orientation as the crystal at the surface and will grow into the glass as indicated by the arrows N in FIG. 2f. The growing crystals will have a low energy interface with the parent crystal and, therefore, a very strong bond. Nuclei generated at the glass external interface grow into the grains as shown at A in FIG. 2a. These nuclei grow until they impinge against each other as shown in the sequence of steps illustrated by reference characters 1, 2, 3 and 4 in the crystal of FIG. 2a. In this case if the temperature is allowed to rise into the range where sintering occurs rapidly, the growth of the nuclei will occur concurrently with the movement of the glass and the glass-crystal boundary edges at M and B. This latter process promotes the elimination of the surfaces thus reducing the void volume at seen at D' in FIG. 2f.

It is apparent from this description that the more glass volume in the starting powder, the more will be the void volume after binder burn-off and the higher the shrinkage. On the other hand, a large crystal volume will produce a smaller shrinkage. Furthermore, it is clear that from the foregoing there should be a certain minimum glass-crystal external interface to promote adequate bonding to provide optimum strength.

When the temperature reaches the point where sintering and crystal growth occur readily, the crystals from the nuclei grow until they impinge against each other or against the crystal-residual glass interface. At the same time the glass-glass boundary, being highly mobile and of high energy due to the grinding process, will be eliminated with an accompanying reduction in voids. The reduction of the void volume, however, is governed by the crystal volume, glass pickup from grinding and the presence of external and internal nucleating agents. Adequate levels of crystallization and nearly complete densification can be achieved at a much lower temperature without excessive grain growth.

Figure 2G:
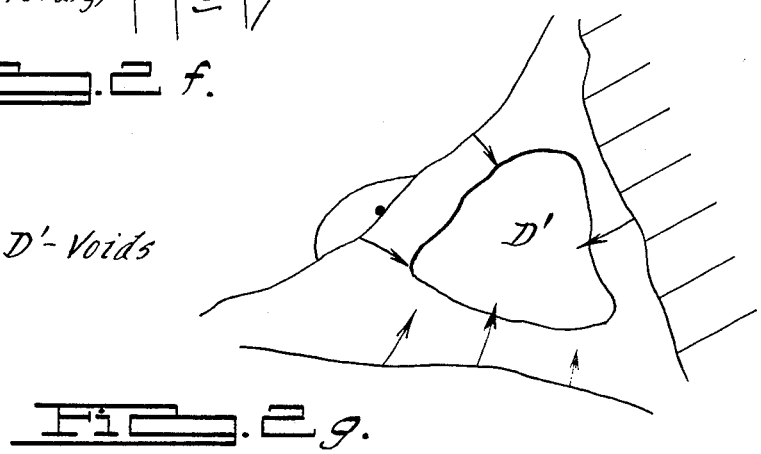

It also should be evident from the foregoing that the final grain size, which is indicated by the dotted lines in FIG. 2a, which is much finer than the starting particle size. It should be noted, however, that even though very fine grain sizes, low thermal expansion and high strength are achieved with low temperature, short-time firing, the strength is not as high as a fully densified material produced from an all glass system. This is because the crystal surfaces do not bond readily at low temperatures even though the bonding of glass-glass surfaces and the glass-crystal surfaces is complete. To achieve full strength, the temperature should be raised to the high end of the crystallization range; for example, in the temperature range of 2,000° to 2,500° F. At this temperature the high energy crystal surfaces of the ground crystal will become bonded by the nucleation of the fresh crystals that grow into the crystal interface. At this temperature grain growth can occur by the agglomeration of grains of nearly identical orientation as indicated by the reference symbols P and Q in FIG. 2g. This reaction will increase the grain size, but there is a substantial increase in strength without excessive shrinkage.

In another embodiment of my invention there are variations that might be used during the preparation of the powder. In this second embodiment of the invention the glass frit is produced in a conventional manner and coarse powder of approximately 20 to 90 microns is obtained by crushing and stamping. That coarse powder then is given pre-crystallization treatment. That treatment comprises heating the coarse powder to a temperature range of about 1,500° to 1,800° F. and holding that temperature for about one to three hours. During that time the glass tends to readily sinter; but to retard or avoid sintering, the glass powder is mixed with 20% to 30% by weight of graphite powder heated in a reducing atmosphere. After the crystallization treatment, graphite and glass powder are separated by fractionation. In the alternative the powder can be heated to a temperature of 1,500° F. for 24 to 48 hours which produces extensive nucleation and some crystal growth without sintering. In either case the powder is fine ground to a size of about ½ to about 20 microns by means of a high energy milling process as discussed earlier.

This pre-crystallization is followed by the firing steps which may be the same as those described earlier in this specification. In this alternate procedure, however, the particles of the precrystallized powder are more rounded since the particles do not contain any cracks and are less friable. Furthermore, there is less glass-glass surface and more crystal-crystal surface than in the process steps described earlier because the grains are rounded, and there is more pickup from the grinding medium. The void volume is larger also because of the greater crystal-crystal surface for any unit volume. The shrinkage will be less and the accompanying porosity will be greater. Because of the more random crystal orientation and finer grain size, the sintering can be carried out at the higher end of the crystallization temperature range without the danger of agglomeration or serious grain growth. The final structure is characterized by fine grains with well distributed porosity and a lowered elastic modulus than in the case of the all-glass process with only a slightly lower strength and improved thermal shock resistance.

Having described my invention, what I claim and desire to secure by U.S. Letters Patent is:

1. A method for preparing a glass ceramic heat exchanger core comprising the steps of producing a glass frit and combining the glass frit with a thermoplastic block polymer binder; the formation of the glass frit comprising the steps of melting a cordierite base glass composition, drawing the glass for a holding period between one-half hour and two hours duration in a temperature range between 2,100° F. and 1,500° F. during which time a substantial portion of the glass is transformed to the crystalline state, and quenching the pre-crystallized glass thereby producing stresses in the glass particles that are severe enough to shatter the glass into tiny fragments and to produce numerous cracks in the crystalline phase; grinding the frit with a high energy ball mill to produce a powder, firing the polymer and glass crystal powder structure, rolling the mixture into a ribbed tape and winding the ribbed tape to form a cylindrical structure; the firing cycle comprising heating the binder-powder structure at a temperature of about 1,000° F. to 1,100° F. to achieve binder burn-off, heating the structure after binder burn-off to a temperature range of 1,400° F. to 1,700° F. at which time nucleation and crystal growth takes place and sintering the structure at a higher temperature range between 2,000° F. and 2,500° F. whereby high energy crystal-crystal interface surfaces of the ground crystal particles become bonded by the nucleation of fresh crystals that grow into the interface.

2. The process as set forth in claim 1 wherein the firing cycle for the binder-powder structure includes the step of heating the powder to a temperature of about 1,500° F. to 1,800° F. very rapidly and holding that temperature for one to three hours duration, which heating step is preceded by mixing with the glass frit 20% to 30% by weight of graphite powder, the heating occuring in a reducing atmosphere, and separating the graphite and glass after crystallization by means of fractionation.

3. The method set forth in claim 1 wherein the glass powder is heated at a temperature of about 1,500° F. for 24 to 48 hours during the pre-crystallization stage prior to firing to produce nucleation and crystal growth without sintering.

4. The method set forth in claim 1 wherein the binder is styrene-butadiene.

5. The method set forth in claim 3 wherein the binder is styrene-butadiene.

* * * * *